(12) United States Patent
Lye et al.

(10) Patent No.: US 11,734,912 B2
(45) Date of Patent: Aug. 22, 2023

(54) COMPUTER READABLE RECORDING MEDIUM WHICH CAN BE USED TO PERFORM IMAGE QUALITY IMPROVEMENT METHOD AND OPTICAL NAVIGATION METHOD

(71) Applicant: PixArt Imaging Inc., Hsin-Chu (TW)

(72) Inventors: Keng Yeen Lye, Penang (MY); Kevin Len-Li Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 204 days.

(21) Appl. No.: 17/308,983

(22) Filed: May 5, 2021

(65) Prior Publication Data
US 2022/0358322 A1 Nov. 10, 2022

(51) Int. Cl.
| | |
|---|---|
| *G06V 10/60* | (2022.01) |
| *G06F 3/041* | (2006.01) |
| *G06F 3/03* | (2006.01) |
| *G06V 10/75* | (2022.01) |
| *G06F 18/24* | (2023.01) |
| *G06F 3/0354* | (2013.01) |
| *G06V 10/764* | (2022.01) |
| *G06V 10/98* | (2022.01) |

(52) U.S. Cl.
CPC .......... *G06V 10/60* (2022.01); *G06F 3/0321* (2013.01); *G06F 3/03543* (2013.01); *G06F 3/0418* (2013.01); *G06F 18/24* (2023.01); *G06V 10/751* (2022.01); *G06V 10/764* (2022.01); *G06V 10/993* (2022.01); *G06F 3/0317* (2013.01)

(58) Field of Classification Search
CPC ...... G06F 3/0321; G06F 3/0418; G06F 18/24; G06F 3/03543; G06F 3/0317; G06V 10/751; G06V 10/60; G06V 10/764; G06V 10/993
See application file for complete search history.

(56) References Cited

U.S. PATENT DOCUMENTS

| | | | |
|---|---|---|---|
| 9,261,982 B2 * | 2/2016 | Chen | G06F 3/03543 |
| 2004/0145568 A1 * | 7/2004 | Ahn | G06F 3/0317 345/166 |
| 2011/0108713 A1 * | 5/2011 | Momtahan | G06F 3/0317 250/216 |

FOREIGN PATENT DOCUMENTS

CN 1716284 A * 1/2006

* cited by examiner

*Primary Examiner* — Amandeep Saini
*Assistant Examiner* — Daniella M. DiGuglielmo
(74) *Attorney, Agent, or Firm* — Winston Hsu

(57) ABSTRACT

A computer readable recording medium storing at least one program, wherein an image quality improvement method is performed when the program is executed. The image quality improvement method comprising: (a) classifying data units of a target image to normal data units and abnormal data units based on relations between brightness values of the data units and a classification parameter, wherein the classification parameter is related with an image quality of the target image or the brightness values of the data units; and (b) adjusting the brightness values of the abnormal data units based on an adjusting parameter to generate adjusted brightness values, such that differences between the adjusted brightness values and the brightness values of the normal data units are reduced. An optical navigation method using the image quality improvement method is also disclosed.

16 Claims, 4 Drawing Sheets

COMPUTER READABLE RECORDING MEDIUM WHICH CAN BE USED TO PERFORM IMAGE QUALITY IMPROVEMENT METHOD AND OPTICAL NAVIGATION METHOD

BACKGROUND OF THE INVENTION

1. Field of the Invention

The present invention relates to a computer readable recording medium which can be used to perform an image quality improvement method and an optical navigation method, and particularly relates to a computer readable recording medium which can be used to perform an image quality improvement method and an optical navigation method which can reduce influence caused by a fixed pattern.

2. Description of the Prior Art

A conventional optical mouse always has a glass surface there below, to prevent an image sensor therein being damaged or being polluted by dirt or dust. The glass surface may have a fixed pattern thereon, for example, the fixed pattern caused by a scratch or dirt. However, if the fixed pattern is too strong, it may bias the optical mouse motion along the fixed pattern, thus causing an unwanted motion.

SUMMARY OF THE INVENTION

Therefore, one objective of the present invention is to provide an image quality improvement method which can reduce influence of a fixed pattern.

Another objective of the present invention is to provide an optical navigation method which can reduce influence of a fixed pattern.

One embodiment of the present invention provides a computer readable recording medium storing at least one program, wherein an image quality improvement method is performed when the program is executed. The image quality improvement method comprising: (a) classifying data units of a target image to normal data units and abnormal data units based on relations between brightness values of the data units and a classification parameter, wherein the classification parameter is related with an image quality of the target image or the brightness values of the data units; and (b) adjusting the brightness values of the abnormal data units based on an adjusting parameter to generate adjusted brightness values, such that differences between the adjusted brightness values and the brightness values of the normal data units are reduced.

Another embodiment of the present invention provides a computer readable recording medium storing at least one program, applied to an optical navigation device comprising an image sensor, wherein an optical navigation method is performed when the program is executed. The optical navigation method comprises: (a) acquiring a sensing image via the image sensor; (b) classifying data units of the sensing image to normal data units and abnormal data units based on relations between brightness values of the data units and a classification parameter, wherein the classification parameter is related with an image quality of the sensing image or the brightness values of the data units; (c) adjusting the brightness values of the abnormal data units based on an adjusting parameter to generate adjusted brightness values, such that differences between the adjusted brightness values and the brightness values of the normal data units are reduced; and (d) computing a motion of the optical navigation device according to the adjusted brightness values and the brightness values of the normal data units.

In view of above-mentioned embodiments, the influence caused by a fixed pattern on the cover for an optical navigation device can be reduced, and the image quality can be increased using the above-mentioned embodiments.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in the following descriptions to explain the concept of the present invention. Each component in the following descriptions can be implemented by hardware (e.g. a device or a circuit) or hardware with software (e.g. a program installed to a processor). Besides, the method in the following descriptions can be executed by programs stored in a non-transitory computer readable recording medium such as a hard disk, an optical disc or a memory. Besides, the term "first", "second", "third" in the following descriptions are only for the purpose of distinguishing different elements, and do not mean the sequence of the elements. For example, a first device and a second device only mean these devices can have the same structure but are different devices.

Figure 1:
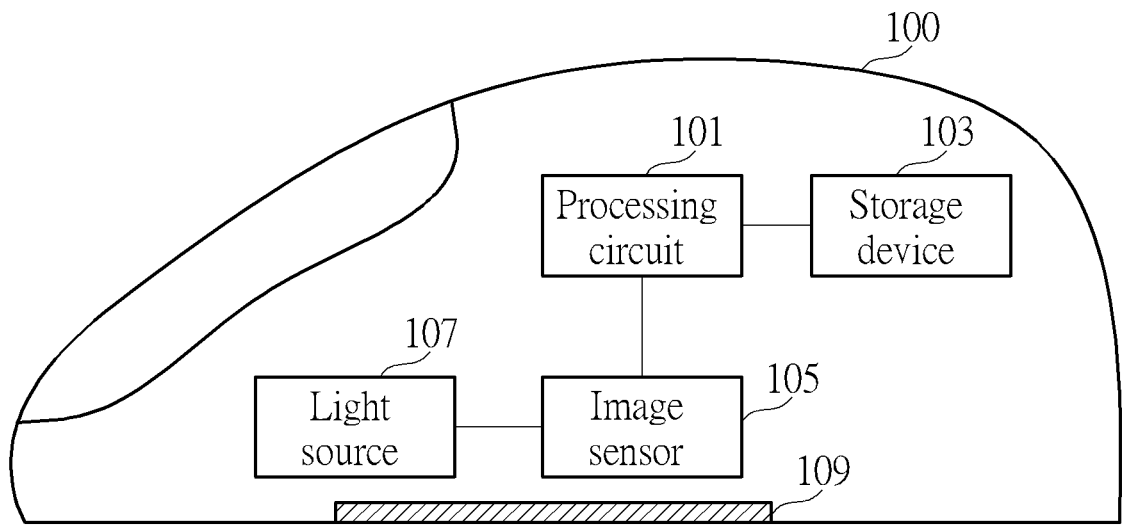
FIG. 1 is block diagram illustrating an optical navigation device which uses an optical navigation method according to one embodiment of the present invention.

FIG. 1 is block diagram illustrating an optical navigation device 100 which uses an optical navigation method according to one embodiment of the present invention. In the embodiment of FIG. 1, the optical navigation device 100 is an optical mouse, but not limited. The optical navigation device 100 can be any other optical navigation device, such as an optical touch panel. Also, the arrangement of the components of the optical navigation device 100 is not limited to the embodiment illustrated in FIG. 1.

As illustrated in FIG. 1, the optical navigation device 100 comprises a processing circuit 101, a storage device 103, an image sensor 105, a light source 107 and a cover 109. The light source 107 is configured to emit light. The image sensor 105 is configured to sense images generated according to the light from the light source 107. For example, the light source 107 emits light passing through the cover 109 to a surface which the optical navigation device 100 is located on (e.g., a desk surface), and the image sensor 105 senses images generated according to the reflected light which passes through the cover 109 and is from the surface. The storage device 103 is configured to store at least one program. An optical navigation method can be performed when the program is executed by the processing circuit 101, which will be described in more detail later.

Figure 2:
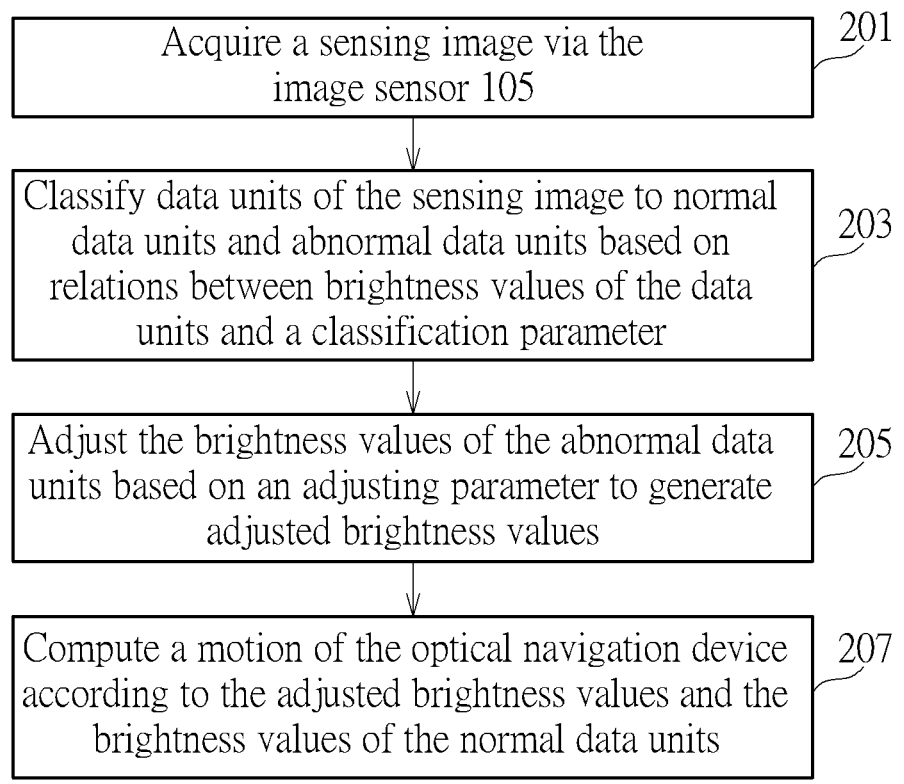
FIG. 2 is a flow chart illustrating an optical navigation method according to one embodiment of the present invention.

FIG. 2 is a flow chart illustrating an optical navigation method according to one embodiment of the present invention, which can be performed by the optical navigation device 100. The optical navigation method comprises the following steps:

Step 201

Acquire a sensing image via the image sensor 105.

Step 203

The processing circuit 101 classifies data units of the sensing image to normal data units and abnormal data units based on relations between brightness values of the data units and a classification parameter. Since the image sensor 105 senses images via the cover 109 in FIG. 1, abnormal data units may exist in the sensing image if the cover 109 has a fixed pattern.

The classification parameter is related with an image quality of the sensing image or the brightness values of the data units. Each of the data units comprises at least one pixel. For the convenience of explaining, in the following embodiments, each of the data units comprise of only pixels.

Step 205

The processing circuit 101 adjusts the brightness values of the abnormal data units based on an adjusting parameter to generate adjusted brightness values, such that differences between the adjusted brightness values and the brightness values of the normal data units are reduced.

Step 207

The processing circuit 101 computes a motion of the optical navigation device 100 according to the adjusted brightness values and the brightness values of the normal data units. Specifically, the processing circuit 101 computes a motion of the optical navigation device 100 according to continuous adjusted images which have the adjusted brightness values and the brightness values of the normal data units.

Figure 3:
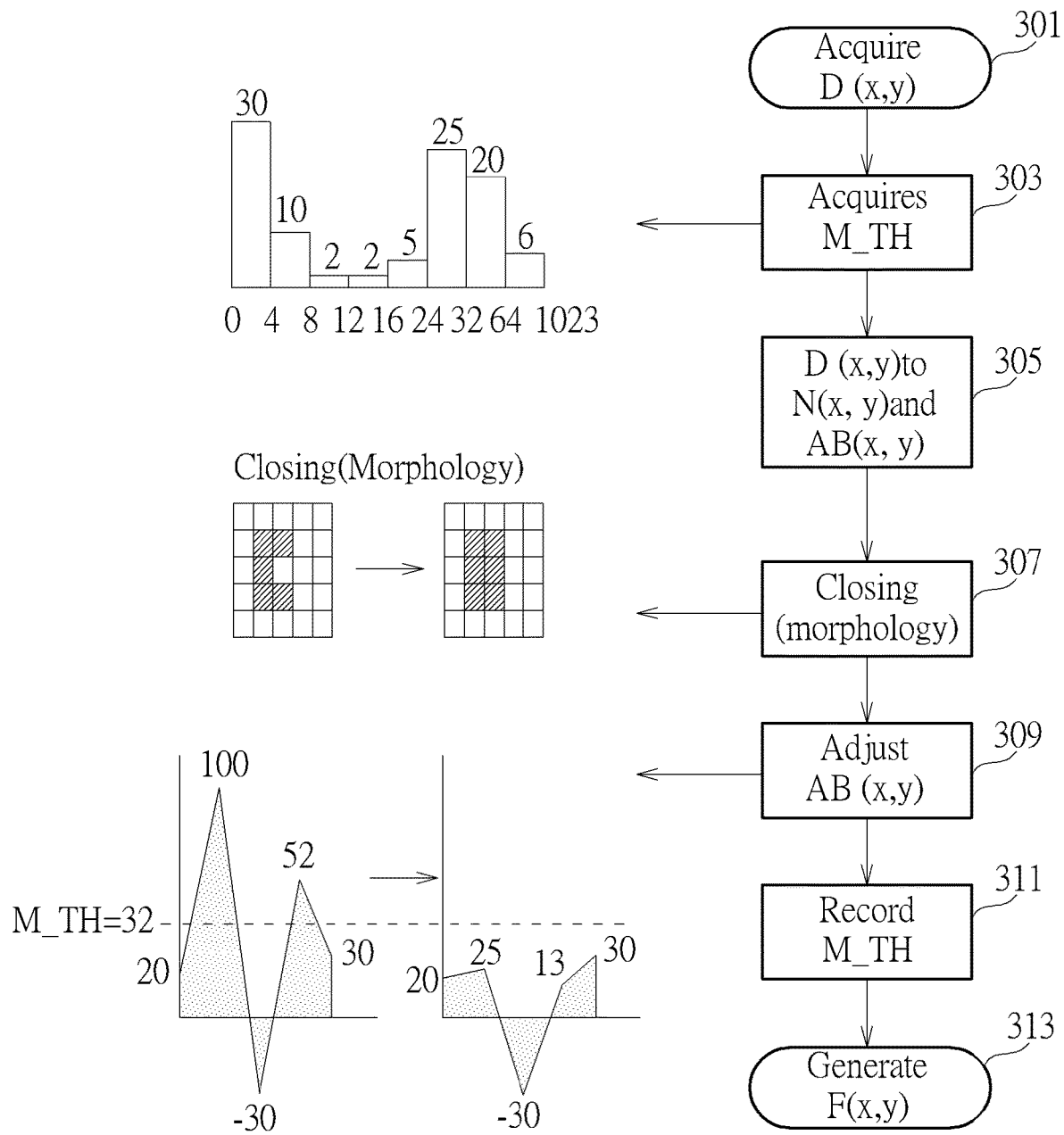
FIG. 3 is a flow chart illustrating a practical example of the optical navigation method illustrated in FIG. 2.

FIG. 3 is a flow chart illustrating a practical example of the flow chart illustrated in FIG. 2. Please note, FIG. 3 is only an example, any steps which can reach the same function should also fall in the scope of the present invention. Further, the scope of the present invention is not limited to the numbers illustrated in FIG. 3.

The flow chart in FIG. 3 comprises:

Step 301 (an Example of Step 201)

The processing circuit 101 acquires a sensing image D (x,y) via the image sensor 105.

The sensing image D (x,y) can be a raw image which is sensed by the image sensor 105. Alternatively, the sensing image D (x,y) can be an image generated via processing the raw image which is sensed by the image sensor 105. For example, the sensing image D (x,y) can be an image generated via filtering the raw image.

As above-mentioned, since the image sensor 105 senses images via the cover 109 in FIG. 1, abnormal data units may exist if the cover 109 has a fixed pattern such as dirt or a scratch.

Step 303 (an Example of Step 203)

The processing circuit 101 acquires the classification parameter M_TH. As above-mentioned, the classification parameter is related with an image quality of the sensing image D (x,y) or the brightness values of the data units of the sensing image D (x,y). In one embodiment, the classification parameter M_TH is determined by a median value of the brightness values of the data units of the sensing image D (x,y). For example, the classification parameter M_TH equals the median value. Please note the brightness values of the sensing image D (x,y) can also be regarded as an image quality of the sensing image D (x,y).

In one embodiment, the classification parameter M_TH is related with the classification parameter M_TH which is used in a previous processing. For example, if the optical navigation device 100 is turned on and the processing in FIG. 2 and FIG. 3 is performed for the first time after the optical navigation device 100 is turned on, the initial classification parameter M_TH is the median value and is recorded. The next classification parameter M_TH is related with the initial classification parameter M_TH. In one embodiment, the classification parameter M_TH is determined via an equation of M_TH=(Bm+P*M_pre)/Q, Bm is a median value of the brightness values of the data units in the sensing image D(x,y), the M_pre is a recorded previous classification parameter, P, Q are positive integers such as 3 and 4.

Step 305 (an Example of Step 203)

The processing circuit 101 classifies data units of the sensing image D (x,y) to normal data units N(x, y) and abnormal data units AB(x, y) based on relations between brightness values of the data units and the classification parameter M_TH. In one embodiments, the data units are classified as the normal data units N(x,y) if absolute values of the brightness values of the data units are lower than the classification parameter M_TH, and classifies the data units as the abnormal data units AB(x, y) if the absolute values of the brightness values of the data units are higher than the classification parameter M_TH.

Therefore, data units in the image portion of the sensing image D (x,y) which has particularly high or particularly low brightness values are classified as abnormal data units AB(x, y).

Step 307

The processing circuit 101 performs closing (morphology) to the abnormal data units AB(x, y). That is, the normal data units N(x, y) between two groups of abnormal data units AB(x, y) are also set as abnormal data units AB(x, y). By this way, the image formed by the abnormal data units AB(x, y) can be more complete and the following steps can be performed without complicated computation. However, the step 307 can be removed in other embodiments.

Step 309 (an Example of Step 205)

The processing circuit 101 adjusts the brightness values of the abnormal data units AB (x,y) based on an adjusting parameter to generate adjusted brightness values.

In one embodiment, the sensing image D (x,y) is adjusted based on following equation:

$F(x,y)=D(x,y)$ if data units are normal data units $N(x,y)$;else $F(x,y)=D(x,y)/K$ F(x,y) means an adjusted image.

Therefore, the above-mentioned equation means brightness values of the normal data units N(x, y) in the sensing image D(x,y) are not changed, and the brightness values of the abnormal data units AB (x,y) are divided by K, wherein k is the adjusting parameter and is a positive number. By this way, the influence caused by the abnormal data units AB (x,y) can be reduced.

In one embodiment, K is related with a number of the abnormal data units AB (x,y) or the brightness values of the abnormal data units AB (x,y). For example, if the number of the abnormal data units AB (x,y) is large or the brightness values of the abnormal data units AB (x,y) are particularly high or particularly low, K can be increased to reduce the influence caused by the abnormal data units AB (x,y). On the contrary, if the number of the abnormal data units AB (x,y)

is small or the brightness values of the abnormal data units AB (x,y) are close to the normal data units N(x,y), K can be decreased. Further, in one embodiment, K is changed frame by frame, such that the influence caused by the abnormal data units AB (x,y) can be reduced more efficiently.

Step 311

Record the current classification parameter M_TH for the next processing. For example, record the current classification parameter M_TH to the storage device 103 in FIG. 1.

Step 313

Generate an adjusted image F(x,y), in which the abnormal data units AB(x,y) have adjusted brightness values.

FIG. 4-FIG. 7 are schematic diagrams illustrating practical examples of the flow chart illustrated in FIG. 3. Please note, FIG. 4-FIG. 7 are only examples for explaining the steps in FIG. 2 and FIG. 3, but do not mean any limitation of the present invention.

Figure 4:
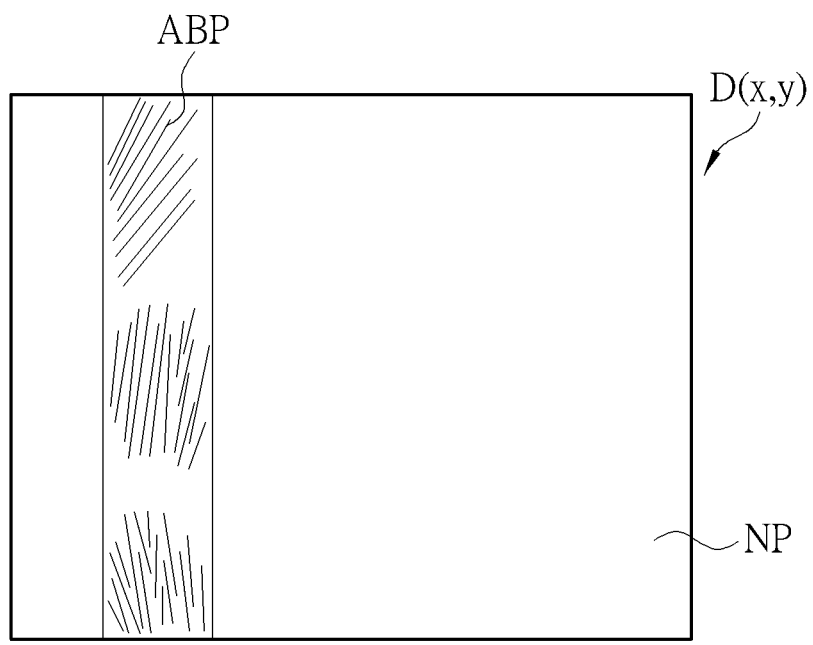
FIG. 4-FIG. 7 are schematic diagrams illustrating practical examples of the flow chart illustrating in FIG. 3.
Figure 5:
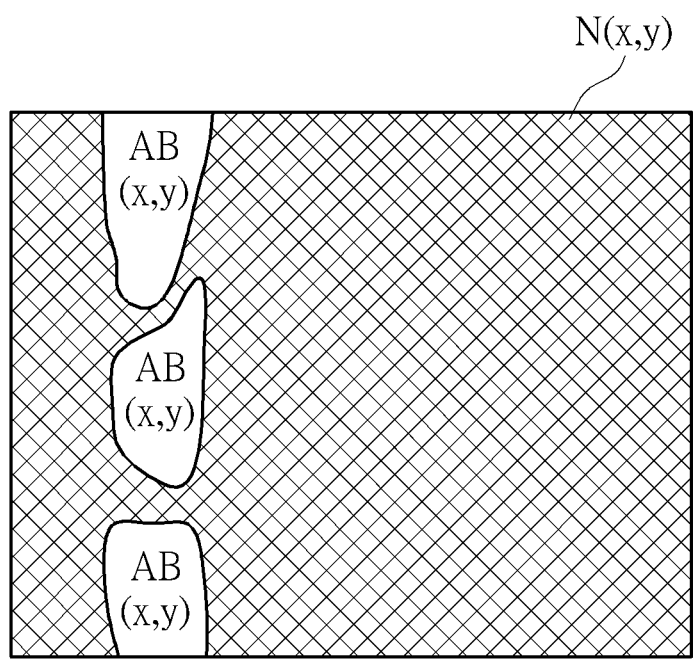

In FIG. 4, the sensing image D(x,y) is acquired, which comprises a normal portion NP and an abnormal portion ABP (e.g., an image caused by a scratch). Also, in FIG. 5, the data units of the normal portion NP are determined as normal data units N(x,y) and the data units of the abnormal portion ABP are determined as abnormal data units AB(x, y). Please note, FIG. 5 only means the data units of the normal portion NP are determined as normal data units N(x,y) or abnormal data units AB(x,y), it does not mean an image shown in FIG. 5 must be generated.

Figure 6:
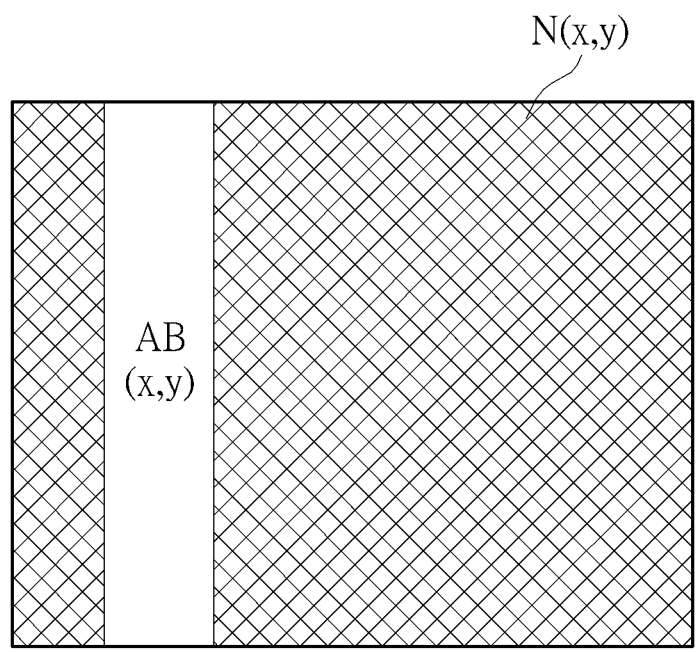
Figure 7:
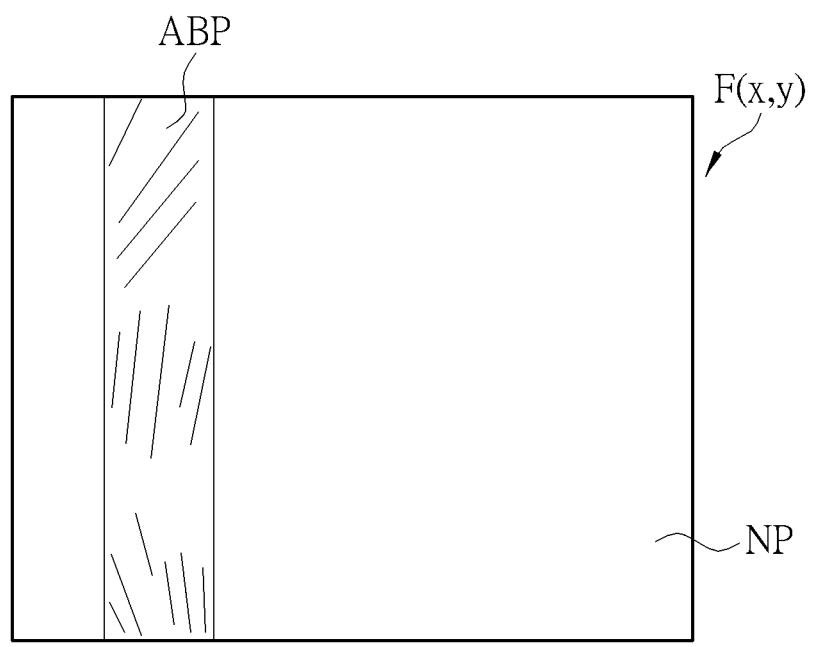

Additionally, in FIG. 6, closing (morphology) is performed to the abnormal data units AB(x, y), therefore the abnormal data units AB(x,y) form a complete region. Furthermore, in FIG. 7, an adjusted image F(x,y) is acquired. The abnormal portion ABP of the adjusted image F(x,y) has adjusted brightness values, and the brightness values of the normal portion NP are the same as which of the normal portion NP in the sensing image D(x,y). By this way, the difference between brightness values of the normal portion NP, the abnormal portion ABP of the sensing image D(x,y) and brightness values of the normal portion NP, the abnormal portion ABP of the adjusted image F(x,y) is decreased. Therefore, the influence caused by the abnormal portion ABP in the image can be reduced.

It will be appreciated the above-mentioned embodiments are not limited to be used in optical navigation. In such case, the method comprises the above-mentioned steps 203, 205 and is regarded as an image quality improvement method for improving a target image. Specifically, the image quality improvement method comprises the steps of: classifying data units of a target image (e.g., the above-mentioned sensing image, but not limited) to normal data units and abnormal data units based on relations between brightness values of the data units and a classification parameter, wherein the classification parameter is related with an image quality of the target image or the brightness values of the data units; and adjusting the brightness values of the abnormal data units based on an adjusting parameter to generate adjusted brightness values, such that differences between the adjusted brightness values and the brightness values of the normal data units are reduced.

In view of above-mentioned embodiments, the influence caused by a fixed pattern on the cover for an optical navigation device can be reduced, and the image quality can be increased using the above-mentioned embodiments.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A non-transitory computer readable recording medium storing at least one program, wherein an image quality improvement method is performed when the program is executed, the image quality improvement method comprising:

(a) classifying data units of a target image to normal data units and abnormal data units based on relations between brightness values of the data units and a classification parameter, wherein the classification parameter is related with an image quality of the target image or the brightness values of the data units; and (b) adjusting brightness values of the abnormal data units based on an adjusting parameter to generate adjusted brightness values, such that differences between the adjusted brightness values and brightness values of the normal data units are reduced.

2. The non-transitory computer readable recording medium of claim 1, wherein the data units are pixels, and the brightness values of the data units are pixel values.

3. The non-transitory computer readable recording medium of claim 1, wherein the step (a) classifies the data units as the normal data units if absolute values of the brightness values of the data units are lower than the classification parameter, and classifies the data units as the abnormal data units if the absolute values of the brightness values of the data units are higher than the classification parameter.

4. The non-transitory computer readable recording medium of claim 1, wherein the classification parameter is determined by a median value of the brightness values of the data units.

5. The non-transitory computer readable recording medium of claim 4, wherein the classification parameter is determined via an equation of M_TH=(Bm+P*M_pre)/Q, wherein the M_TH is the classification parameter, the Bm is a median value of the brightness values of the data units, the M_pre is a recorded previous classification parameter, the P and the Q are positive integers.

6. The non-transitory computer readable recording medium of claim 1, wherein the step (b) adjusts the brightness values of the abnormal data units by dividing the brightness values of the abnormal data units by K, wherein K is the adjusting parameter and is a positive number.

7. The non-transitory computer readable recording medium of claim 6, wherein K is related with a number of the abnormal data units or the brightness values of the abnormal data units.

8. The non-transitory computer readable recording medium of claim 7, wherein K is changed frame by frame.

9. A non-transitory computer readable recording medium storing at least one program, applied to an optical navigation device comprising an image sensor, wherein an optical navigation method is performed when the program is executed, the optical navigation method comprising:

(a) acquiring a sensing image via the image sensor;

(b) classifying data units of the sensing image to normal data units and abnormal data units based on relations between brightness values of the data units and a classification parameter, wherein the classification parameter is related with an image quality of the sensing image or the brightness values of the data units;

(c) adjusting brightness values of the abnormal data units based on an adjusting parameter to generate adjusted brightness values, such that differences between the adjusted brightness values and brightness values of the normal data units are reduced; and (d) computing a motion of the optical navigation device according to the adjusted brightness values and the brightness values of the normal data units.

10. The non-transitory computer readable recording medium of claim 9, wherein the data units are pixels, and the brightness values of the data units are pixel values of the pixels.

11. The non-transitory computer readable recording medium of claim 9, wherein the step (b) classifies the data units as the normal data units if absolute values of the brightness values of the data units are lower than the classification parameter, and classifies the data units as the abnormal data units if the absolute values of the brightness values of the data units are higher than the classification parameter.

12. The non-transitory computer readable recording medium of claim 9, wherein the classification parameter is determined by a median value of the brightness values of the data units.

13. The non-transitory computer readable recording medium of claim 12, wherein the classification parameter is determined via an equation of $M\_TH=(Bm+P*M\_pre)/Q$, wherein the M_TH is the classification parameter, the Bm is a median value of the brightness values of the data units, the M_pre is a recorded previous classification parameter, the P and the Q are positive integers.

14. The non-transitory computer readable recording medium of claim 9, wherein the step (c) adjusts the brightness values of the abnormal data units by dividing the brightness values of the abnormal data units by K, wherein K is the adjusting parameter and is a positive number.

15. The non-transitory computer readable recording medium of claim 14, wherein K is related with a number of the abnormal data units or the brightness values of the abnormal data units.

16. The non-transitory computer readable recording medium of claim 15, wherein K is changed frame by frame.

* * * * *